United States Patent [19]

Haskins

[11] 4,153,304

[45] May 8, 1979

[54] APPARATUS FOR TRANSPORTING FLOWABLE PARTICULATE MATERIAL

[75] Inventor: Richard H. Haskins, Worcester, England

[73] Assignee: Hascon (U.K.) Limited, England

[21] Appl. No.: 824,512

[22] Filed: Aug. 15, 1977

[30] Foreign Application Priority Data

May 3, 1977 [GB] United Kingdom ............... 18575/77

[51] Int. Cl.² ......................... B65G 53/22; B65G 3/14
[52] U.S. Cl. ...................................... 406/28; 406/126; 406/133; 406/138
[58] Field of Search ....................... 302/35, 41, 42, 47, 302/51, 53, 54, 57

[56] References Cited

U.S. PATENT DOCUMENTS

| | | | |
|---|---|---|---|
| 3,179,378 | 4/1965 | Zenz et al. | 302/53 |
| 3,964,793 | 6/1976 | Volpeliere | 302/42 |

FOREIGN PATENT DOCUMENTS

| | | | |
|---|---|---|---|
| 1332837 | 10/1973 | United Kingdom | 302/53 |
| 1362509 | 8/1974 | United Kingdom | 302/53 |

Primary Examiner—Robert B. Reeves
Assistant Examiner—Jeffrey V. Nase
Attorney, Agent, or Firm—Robert D. Yeager

[57] ABSTRACT

Apparatus for transporting flowable particulate material including a container for receiving the material and having a material receiving chamber and a material inlet, and a gas inlet chamber with a gas inlet, the two chambers being separated by a porous wall, a material outlet, a pressure sensor in the material receiving chamber and a valve operated by the sensor when a predetermined pressure occurs in the material receiving chamber for opening said material outlet, the material outlet including a conduit between the material receiving chamber and a location external to the container, one end portion of the conduit being movable relative to another portion thereof to provide a predetermined spaced relationship between the end portion of the conduit and the porous wall, the gas inlet chamber being separated into two parts by a gas inlet compartment depending within the chamber from the porous wall and two manually adjustable control valves for controlling the supply of gas to the chamber and compartment respectively, according to the particular material being handled.

5 Claims, 5 Drawing Figures

APPARATUS FOR TRANSPORTING FLOWABLE PARTICULATE MATERIAL

BACKGROUND OF THE INVENTION

1. Field of the Invention

This invention relates to apparatus for transporting flowable particulate material and is an improvement in the invention described and claimed in U.K. Pat. No. 1,362,509 which itself is an improvement in the invention described and claimed in U.K. Pat. No. 1,332,837.

2. Description of the Prior Art

The teachings of U.K. Pat. No. 1,332,837 and U.K. Pat. No. 1,362,509 are hereby incorporated by reference in the instant application.

The claims of U.K. Pat. No. 1,362,509 provide apparatus of the kind comprising a container for receiving the material to be transported, said container including a material receiving chamber and a gas inlet chamber adjacent said material receiving chamber and separated therefrom by a porous wall, a material inlet in said container communicating with said material receiving chamber, means for opening and shutting said material inlet, a gas inlet connected to said gas inlet chamber, means for opening and shutting said gas inlet, a material outlet permitting transportation of material from said material receiving chamber, means for opening and shutting the material outlet, a pressure sensor in said material receiving chamber, and means operated by said pressure sensor when sensing a predetermined pressure in said material receiving chamber for opening said material outlet, wherein said material outlet comprises a conduit between said material receiving chamber and a location external to said container, one end portion of said conduit being permitted relative longitudinal movement with respect to another portion of said conduit to provide a predetermined spaced relationship between said one portion and said porous wall.

In an embodiment of the invention described in said U.S. Pat. No. 1,362,509, the apparatus for transporting flowable particulate material comprises an upstanding cylindrical container, the lower part including a tapered portion from which a right cylindrical portion depends. The lower end of the right cylindrical portion has a radial flange to which an end cap is secured, the end cap defining a gas inlet chamber separated into two parts by a gas inlet compartment. The gas inlet chamber is separated from the remainder of the container, constituting a material receiving chamber by a porous wall of ceramic material having apertures therein.

The upper surface of the porous wall mounts an abutment plate adjacent the lower end of an upstanding cylindrical conduit constituting a material outlet. The upper part of the conduit passes outwardly of the container through the top thereof and the lower part is curved to be in coaxial alignment with the container. The lower part of the upper portion of the conduit is attached to the radially inner wall of a coaxial and cylindrical connecting sleeve which depends from the upper portion of the conduit. The lower part of the radially inner wall of the sleeve is threaded to provide a coaxial connection with a second portion of the conduit depending therefrom. The second portion comprises an upper part which tapers towards the top of the container. The lower part has a greater diameter than the upper part. The arrangement is such that rotation of the second portion of the conduit within the sleeve causes axial movement of the second portion towards or away from the first portion according to the sense of rotation. Such axial movement varies the spacing between the lower end of the second portion and the upper surface of the porous wall, the spacing being predetermined according to the material being handled and defining an annular inlet in cooperation with a conical member.

The conical member defines a nozzle comprising a cup-shaped element whose base is uppermost in juxtaposition with the base of a frusto-conical stainless steel element which is coaxial thereto and tapers upwardly. The mouth of the cup-shaped element is dimensioned to sealingly engage an annular rim formed on the abutment plate. The two elements are retained in position by a stainless steel bolt passing downwards and coaxially through the two elements. The upper part of the bolt includes a conical head which tapers upwardly, the lower end of the bolt being screwed into a frame connected to the abutment plate. The cup-shaped element has a porous side wall formed of sinter bronze. The porosity of the side wall is sufficient to allow a gas, such as air, to permeate therethrough but insufficient to allow any material being handled to pass therethrough. The cup of the cup-shaped element communicates with a gas inlet compartment by means of a conduit extending therebetween. A conical member extends coaxially and upwardly into the second portion of the material outlet conduit. Thus, the size of the annular inlet may be varied by axial movement of the second portion of the material outlet conduit with respect to the remainder of the conduit and the conical member.

SUMMARY OF THE INVENTION

An object of the present invention is to provide improved means for controlling the gas/material mixture at the nozzle.

Thus, according to the present invention there is provided apparatus for transporting flowable particulate material and the like comprising a container for receiving the material to be transported, said container including a material receiving chamber and a gas inlet chamber adjacent said material receiving chamber and separated therefrom by a porous wall, a material inlet in said container communicating with said material receiving chamber, means for opening and shutting said material inlet, a gas inlet connected to said gas inlet chamber, means for opening and shutting said gas inlet, a material outlet permitting transportation of material from said material receiving chamber, means for opening and shutting the material outlet, a pressure sensor in said material receiving chamber, and means operated by said pressure sensor when sensing a predetermined pressure in said material receiving chamber for opening said material outlet, wherein said material outlet comprises a conduit between said material receiving chamber and a location external to said container, one end portion of said conduit being permitted relative longitudinal movement with respect to another portion of said conduit to provide a predetermined spaced relationship between said one portion and said porous wall and wherein said gas inlet chamber is separated into two parts by a gas inlet compartment depending within the chamber from the porous wall, and two manually adjustable control valve means for controlling the supply of gas to the chamber and compartment respectively according to the particular material being handled.

BRIEF DESCRIPTION OF THE DRAWINGS

The invention will now be described by way of example only with particular reference to the accompanying drawing wherein.

DESCRIPTION OF THE PREFERRED EMBODIMENT

Figure 3:
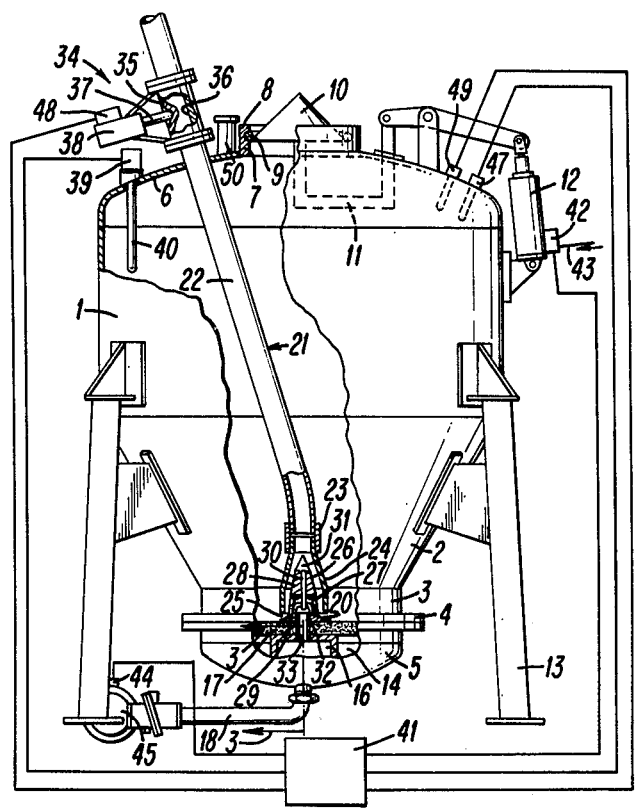
FIG. 3 shows an embodiment of apparatus for transporting particulate material as described in my Great Britain Pat. No. 1,362,509.

Referring now to FIG. 3 of the drawings, apparatus for transporting flowable parituclate material comprises an upstanding cylindrical container 1. The lower part of the container includes a tapered portion 2 from which a right cylindrical portion 3 depends. The lower end of the right cylindrical portion has a radial flange 4 to which an end cap 5 is secured by known methods. The container has a domed top 6 having a coaxial material inlet 7 formed therein. The inlet 7 includes an annular extension 8 which extends coaxially outwards with respect to the container. The annular extension 8 includes an annular seal 9 located in the inner wall thereof. The inlet is opened or shut by means of a conical valve member 10 movable axially with respect to the container and arranged to seat against the seal 9. Axial movement of the valve member 10 is caused by a linkage 11 which is actuated by an air operated piston and cylinder unit 12. The container 1 is supported by upstanding brackets 13.

Figure 5:
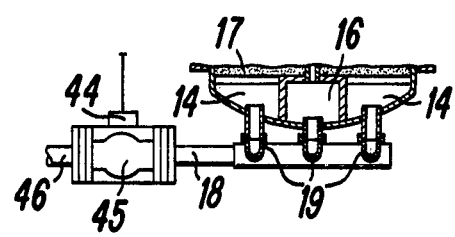

The end cap 5 defines a gas inlet chamber 14 separated into two parts by a gas inlet compartment 16. The gas inlet chamber 14 is separated from the remainder of the container constituting a material receiving chamber, by a porous wall 17 formed of a suitable ceramic material having apertures therethrough so as to pneumatically connect the chamber 14 with the material receiving chamber. The apertures are small enough to prevent material introduced into the container from falling through the plate 17 into the gas inlet chamber 14. Each part of the gas inlet chamber 14 and the gas inlet compartment 16 are respectively connected to a gas inlet 18 by means of a respective manually operated supply valve 19 (see FIG. 5).

The upper surface of the plate 17 mounts an abutment plate 20 adjacent the lower end of an upstanding cylindrical conduit 21 constituting a material outlet. The conduit 21 comprises a first portion 22 which passes outwardly of the container through the top 6 and at an angle to the axis of the container 1. The lower part of the first portion 22 is curved so that it is in coaxial alignment with the container 1. The lower end of the first portion 22 is attached to the radially inner wall of a coaxial and cylindrical connecting sleeve 23 which depends from the first portion. The lower part of the radially inner wall of the sleeve 23 is threaded to provide a coaxial connection with a second portion 24 of the conduit depending therefrom. The second portion 24 comprises an upper part connected to a lower part by an intermediate part which tapers towards the top 6 of the container 1. The lower part has a greater diameter than the upper part. The arrangement is such that rotation of the second portion 24 within the sleeve 23 causes axial movement of the second portion 24 towards or away from the first portion 22 according to the sense of rotation. Such axial movement varies the spacing between the lower end of the second portion 24 and the upper surface of the plate 17, the spacing being predetermined according to the material being handled and defining an annular inlet 25 in co-operation with a conical member 26.

The conical member 26 defines a nozzle comprising a cup-shaped element 27 whose base is uppermost in juxtaposition with the base of a frusto conical stainless steel element 28 which is coaxial thereto and tapers upwardly. The mouth of the cup-shaped element 27 is dimensioned to sealingly engage an annular rim 29 formed on the abutment plate 20. The two elements 27 and 28 are retained in position by a stainless steel bolt 30 passing downwards and coaxially through the two elements. The upper part of the bolt 30 includes a conical head 31 which tapers upwardly, the lower end of the bolt being screwed into a frame 32 connected to the abutment plate 20. The cup-shaped element 27 has a porous side wall formed of sinter bronze. The porosity of the side wall is sufficient to allow a gas, such as air, to permeate therethrough but insufficient to allow any material being handled to pass therethrough. The cup of the element 27 communicates with the gas inlet compartment 16 by means of a conduit 33 extending therebetween. The conical member 26 extends coaxially and upwardly into the second portion 24 of the conduit 21.

Thus, the size of the annular inlet 25 may be varied by axial movement of the second portion 24 with respect to the remainder of the conduit and the conical member 26.

The outer end part of the first conduit portion 22, preferably external to the container 1, includes a valve 34 defining means for opening and shutting the material outlet. The valve 34 comprises a known pinch valve having a flexible member 35 which can be pushed against a wall 36 by a movable member 37 actuated by an air operated piston cylinder unit 38 or other suitable means so as to open or shut the conduit. The outer end of the conduit 21 is connected to suitable conveying means (not shown) for receiving material transported from the interior of the container.

A container level sensor 39 is provided within the container for sensing the level of material introduced therein. The sensor comprises a known capacitance type material level probe 40 depending from the top 6 of the container to a predetermined level in the container. The probe 40 is connected electrically to a control device 41 which operates a solenoid or other suitable means 42 for introducing gas, such as air, into the piston cylinder unit 12 through a line 43 to close the inlet 7 by means of the member 10 when a signal is received from the probe 40, and, for operating a solenoid 44 opening an air pressure supply valve 45 in an air line 46 thereby introducing air under pressure into the gas inlet 18. (See also FIG. 5).

A first pressure sensing device 47 is located in the upper part of the material receiving chamber for sensing a first predetermined pressure therein. The first pressure sensing device 47 is electrically connected through a switch in the control device 41 to actuate a solenoid 48 or other suitable means for introducing air into the piston cylinder unit 38 so as to open the valve 34. The first predetermined pressure sensed is a pressure substantially equal to the pressure in the gas inlet chamber 14 after respective valves 19 have been opened. The gas inlet compartment 16 may also have gas under pressure admitted thereto if the characteristics of the material being handled require gas under pressure to be admitted to the second portion of the conduit in order to provide a separate air supply at the annular inlet 25 and/or to provide an increase of gas velocity at the lower end portion of the conduit 21 for transporting material through the conduit under optimum flow conditions for the material being handled.

A second pressure sensing device 49 is located in the upper part of the material receiving chamber to sense a second predetermined air pressure lower than the first. The sensing device 49 is connected to the control device 41 to actuate the solenoids 44 and 48 for shutting the valves 45 and 34 when the pressure in the material receiving chamber drops to a predetermined level.

In operation the piston cylinder unit 12 is operated to open the material inlet 7 so as to allow the entry of material while the valve 45 is shut. A gas pressure relief valve 50 located in the top of the container exhausts air from the material receiving chamber as it fills up with material. When the probe 40 senses a predetermined material level, the piston cylinder unit 12 is operated to shut the material inlet 7 and to open the air pressure supply valve 45 so as to introduce air into the gas inlet 18.

The respective valves 19 are opened to admit gas under pressure into the chamber 14, and the compartment 16, as required. The gas passes through the porous wall 17, and the porous side wall of the cup-shaped element 27 if gas is supplied to the compartment 16, and into the material receiving chamber so as to fluidize the batch of material in the material chamber.

When the first pressure sensing device 47 senses the first predetermined pressure within the material chamber, thereby indicating that the material therein is in a fluidized condition, the valve 34 is opened to permit the material within the material chamber to pass out of the container through the conduit 21. As the material passes out of the container, the pressure within the container drops, and when the second predetermined pressure is reached, the second pressure sensor device 49 actuates the solenoids to shut the valve 34 and air pressure supply valve 45. At this point, substantially all the material in the container has been transported out from the material receiving chamber through the conduit 21. The apparatus is then ready for the next operation of opening the inlet so as to again fill the container with material.

If desired, the control device 41 can be set to automatically actuate the piston cylinder unit 12 through the second sensor device 49 so that the material inlet to the container is automatically opened upon shutting of the valve 34 and the air pressure supply valve 45 so as to substantially continuously transport batches of material from the container.

Figure 4:
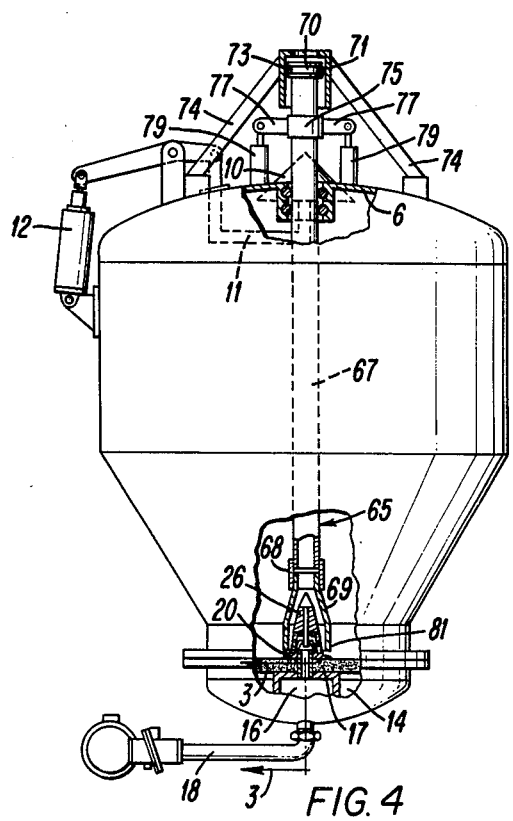
FIG. 4 shows another embodiment described in my Great Britain Pat. No. 1,362,509; and, FIG. 5 is a section view on the line 3—3 of FIGS. 3 and 4.

Another embodiment of the apparatus is suitable for high temperature operation. Referring to FIG. 4, a material outlet 65 comprises a conduit having a first portion 67 coaxial with the container and extending upwardly and axially through and out from the top of the container. The conduit 65 is mounted to be axially movable with respect to the container, the conduit having a sleeve 68 connecting the first portion 67 to a second portion 69. The sleeve 68 and the second portion 69 are similar to the sleeve 23 and the second portion 24 described with reference to FIG. 3. The outer end 70 of the conduit, external to the container, is mounted in a sleeve 71 with a suitable seal 73 and is slidable with respect to the sleeve. The sleeve 71 is supported in a fixed position with respect to the top of the container by braces 74. A material conveying conduit (not shown) is connected to the outer end of the sleeve 71 so as to communicate with the conduit 65. Also mounted on the top of the container are means for axially moving the conduit 65 relative to the sleeve 71. These means include a collar 75 connected to the conduit 65. Radial arms 77 extend from the collar and each arm is attached to a respective air operated piston cylinder unit 79 connected to the top of the container. The piston cylinder units 79 are operable to move the collar 75, and thus the conduit attached thereto, upwardly or downwardly with respect to the container. The lower end 81 of the conduit 65 is normally spaced a short distance from the porous plate 17 to provide, with the conical member 26, the annular inlet 25 for discharging the material from within the container.

In this embodiment, the lower end 81 of the conduit and the upper surface of the abutment plate 20 provide a valve constituting means for opening or shutting the material outlet. When filling the container with material to be transported, through the material inlet, and which inlet is now located adjacent the conduit, the piston cylinder units 79 are in their retracted or lowered position so that the lower end 81 of the conduit is firmly in sealing abutment against the abutment plate 20 so as to shut the inlet end of the conduit. Compressed air is introduced into the air chamber, and the gas compartment if required, as bofore so as to fluidize the material therein, and when the proper state of fluidization has been reached, the conduit is then moved upwardly by the piston cylinder units 79 so as to form the annular inlet 25 through which the fluidized material can flow so as to pass through the conduit and out of the container. In this embodiment, all the seals for sealing the container, such as the seal 73, are made of a suitable heat resistant material such as Teflon, (Registered Trademark).

Similar controls as employed in the first described embodiment, including the material level probe and the high and low pressure sensors, can be used in this embodiment, with the piston cylinder units 79 being connected in the control device so that the conduit will be opened automatically when a predetermined high pressure, sensed by the first sensor, is reached within the container during fluidization of the material therein, and, when the low pressure has been reached as the material is transported, the conduit will be lowered automatically to provide a seal between the conduit and the interior of the container.

Figure 1:
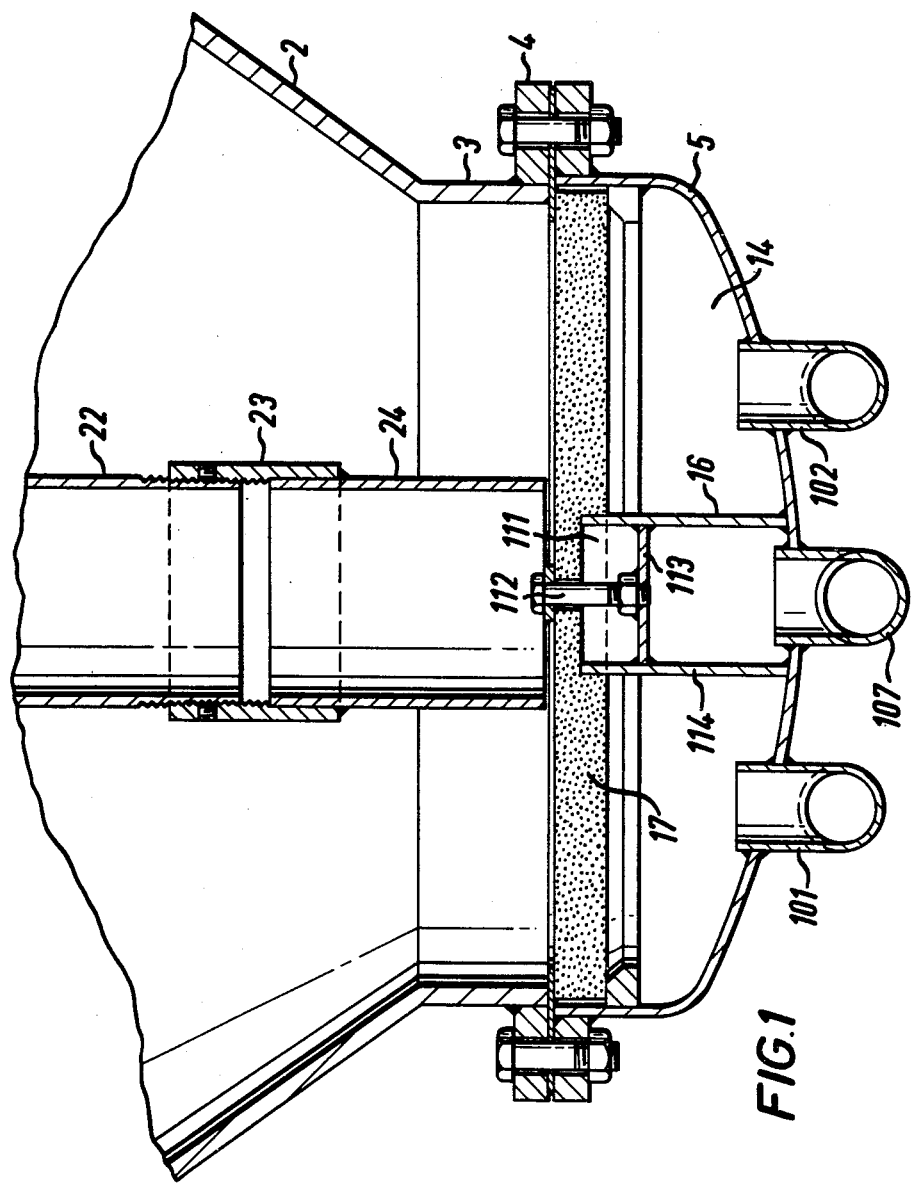
FIG. 1 is a sectional view of the lower half of the apparatus of the invention showing the lower part of the material receiving container and showing the gas inlet compartment within the gas inlet chamber
Figure 2:
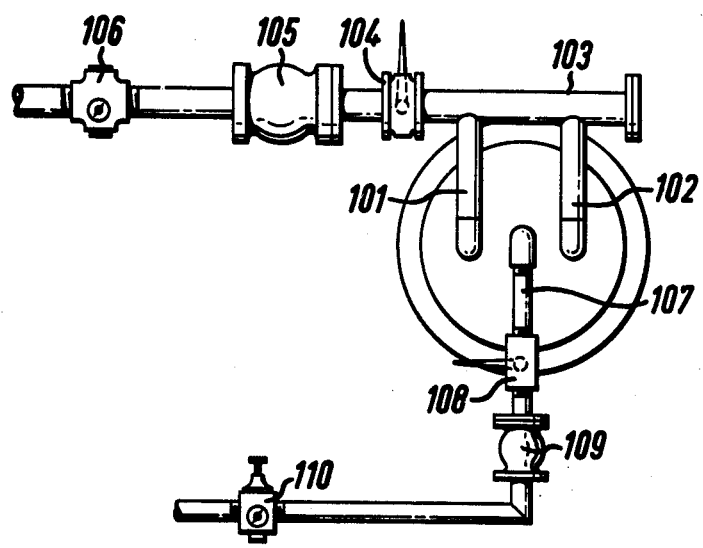
FIG. 2 is an underneath plan view of the gas inlet chamber showing the gas supply connections and valves.

With this embodiment, materials having a temperature of 600° F., or more can be transported without adversely effecting the apparatus since flexible valve members, not suitable for high temperature use, are not used in the apparatus. Referring now to FIGS. 1 and 2 apparatus embodying the teachings of the present invention are shown. The items not shown are substantially the same as the apparatus shown in FIG. 3.

The tapered portion of the lower part of the material receiving container is shown at 2 with the right cylindrical portion 3 depending therefrom, and the radial flange 4 to which the end cap 5 is secured.

The end cap 5 defines the gas inlet chamber 14 separated into two parts by the gas inlet compartment 16. The gas inlet chamber 14 is separated from the remainder of the material receiving container by the ceramic porous wall 17. The upper section of the material outlet conduit is shown at 22, the lower portion of this section being externally threaded to engage with the internally threaded sleeve 23 attached to the lower section 24 of the material outlet conduit.

In the present invention two manually adjustable control valves control the flow of gas to the gas inlet chamber 14 and the gas inlet compartment 16. The gas inlet chamber 14 has two gas supply conduits 101, 102, (see also FIG. 2) connected to a manifold 103 and controlled by a single manually adjustable control valve consisting of a butterfly valve 104, a pinch valve 105 and a regulator 106.

Gas inlet compartment 16 has a single gas supply conduct 107 connected thereto and connected via butterfly valve 108 and pinch valve 109 to regulator 110.

Where materials to be conveyed are readily fluidisable, the control valve controlling the gas supply to chamber 14 is used alone, but when a material to be handled is not easily fluidisable and therefore requires the introduction of a separate gas supply at the annular opening, or an increase in the velocity of the gas, the manually operable control valve 108, 109, 110, controlling the gas supply to compartment 16 is opened to a degree dependent on the material to be handled.

The wall of the gas inlet compartment 16 is located in a circular section 111 bored out of the undersurface of the porous wall 17 to a minimum depth of 33% of the total thickness of the wall 17 and to a maximum depth of 66% of the total thickness of the wall 17. This enables the gas introduced into compartment 16 to flow through the reduced section of the porous wall at one and a half times the gas flow rate (when the bored out section is 33% of the total thickness of the wall 17) or at three times the normal air flow rate (when the bored out section is 66% of the total thickness of the wall 17). The reduced section portion of the wall 17 allowing the increase in gas flow rates referred to above replaces the sinter bronze cup-shaped element previously used in the apparatus described in U.K. Pat. No. 1,362,509.

In order to ensure that the centre of the porous wall 17 is held rigid when resisting gas pressure in compartment 16, the porous wall 17 is held in position by a retaining bolt 112 extending through the wall 17 and secured to a support 113 extending between the walls 114 of compartment 16, which is welded or otherwise mounted on the interior of the wall of the end cap 5.

In addition to the change in gas flow rate achieved by the arrangement described above, the gas supply to the chamber 14 and compartment 16 are provided with separate regulator control from the gas supply (not shown) to the chamber and compartment, thus allowing a differential to be established between the gas in the inner compartment 16 and that in the outer chamber 14. This allows the gas pressure in the inner compartment 16 to be operated at a higher figure than that of the gas passing into the outer chamber 14. Thus, the apparatus is capable of conveying or transporting an even wider range of materials, than with the prior arrangements, whilst employing the minimum amount of gas according to particular requirements, through the control valves and by manipulation of the gas flow and gas pressure differentials.

Referring to FIG. 1, the two air connections marked 101 and 102 are those previously referred to for supplying gas to the outer chamber 14. These two gas supply conduits are connected to the manifold 103 and then controlled by the single manually adjusted control valve 104, 105, 106. The on-off operation of the gas at this point is controlled by the pinch valve 105 and beyond this point, the regulator 106 is set manually by operating personel at a value consistent with the material being handled. The separate gas supply to compartment 16 and designated 107 in the drawing is controlled in a similar but entirely separate manner permitting the establishment of the flow and pressure differentials referred to previously. In all other respects the apparatus of FIGS. 1 and 2 is substantially the same as that shown in FIGS. 3 and 5 and shown and described in U.K. Patent specification No. 1,362,509.

I claim:

1. Apparatus for transporting flowable particulate material and of the kind comprising a container for receiving the material to be transported, said container including a material receiving chamber and a gas inlet chamber adjacent said material receiving chamber and separated therefrom by a porous wall, a material inlet in said container communicating with said material receiving chamber, means for opening and shutting said material inlet, a gas inlet connected to said gas inlet chamber, means for opening and shutting said gas inlet, a material outlet permitting transportation of material from said material receiving chamber, means for opening and shutting the material outlet, a pressure sensor in said material receiving chamber, and means operated by said pressure sensor when sensing a predetermined pressure in said material receiving chamber for opening said material outlet, wherein said material outlet comprises a conduit between said material receiving chamber and a location external to said container, one end portion of said conduit being permitted relative longitudinal movement with respect to another portion of said conduit to provide a predetermined spaced relationship between said one portion and said porous wall and wherein said gas inlet chamber is separated into two parts by a gas inlet compartment depending within the chamber from the porous wall, and two manually adjustable control valve means for controlling the supply of gas to the gas inlet chamber and the gas inlet compartment respectively according to the particular material being handled, a bore formed in said porous wall for receiving said gas inlet compartment, the depth of said bore is less than the thickness of said porous wall.

2. Apparatus as claimed in claim 1 wherein one of said two manually adjustable control valve means is connected to a single gas supply inlet for the compartment whilst the other control valve means is connected via a manifold to a pair of gas supply inlets for the gas inlet chamber, the control valve means being separately controllable to vary the gas supply and/or the velocity thereof to the chamber or to the chamber and compartment according to the particular material being handled and permitting the establishment of a pressure differential between the gas supplied to the compartment and that in the gas inlet chamber.

3. Apparatus as claimed in claim 2 wherein the control valve means for the compartment and chamber gas supply inlets each include a butterfly valve and a pinch valve serially connected between a manually operable regulator and the single gas supply inlet of the compartment or the manifold of the gas supply inlets of the chamber respectively.

4. Apparatus for transporting flowable particulate material and of the kind comprising a container for receiving the material to be transported, said container including a material receiving chamber and a gas inlet chamber adjacent said material receiving chamber and separated therefrom by a porous wall, a material inlet in said container communicating with said material receiving chamber, means for opening and shutting said material inlet, a gas inlet connected to said gas inlet chamber, means for opening and shutting said gas inlet, a material outlet permitting transportation of material from said material receiving chamber, means for opening and shutting the material outlet, a pressure sensor in said material receiving chamber, and means operated by said pressure sensor when sensing a predetermined pressure in said material receiving chamber for opening said material outlet, wherein said material outlet comprises a conduit between said material receiving chamber and a location external to said container, one end portion of said conduit being permitted relative longitudinal movement with respect to another portion of said conduit to provide a predetermined spaced relationship between said one portion and said porous wall and wherein said gas inlet chamber is separated into two parts by a gas inlet compartment depending within the chamber from the porous wall, and two manually adjustable control valve means for controlling the supply of gas to the gas inlet chamber and the gas inlet compartment respectively according to the particular material being handled, and the compartment is formed by a cylindrical member located within a circular bore in the undersurface of the porous wall and extending therefrom to the inner surface of the wall of the gas inlet chamber, the depth of the bore is less than the thickness of the porous wall and determines the flow rate of the gas flowing through the gas inlet compartment.

5. Apparatus as claimed in claim 4 wherein the cylinder is secured to the porous wall by securing means extending through the porous wall and located in a support extending between the cylinder wall to maintain the centre of the porous wall substantially rigid when the chamber and compartment are subjected to the pressure of the gas supplied thereto.

* * * * *

UNITED STATES PATENT AND TRADEMARK OFFICE
CERTIFICATE OF CORRECTION

PATENT NO. : 4,153,304
DATED : May 8, 1979
INVENTOR(S) : Richard H. Haskins

It is certified that error appears in the above-identified patent and that said Letters Patent are hereby corrected as shown below:

Column 1, line 40, "U.S." should read --U.K.-- .

Column 6, line 37, "bofore" should read --before--.

Signed and Sealed this

Twenty-eighth Day of August 1979

[SEAL]

Attest:

LUTRELLE F. PARKER

*Attesting Officer*   *Acting Commissioner of Patents and Trademarks*